United States Patent [19]

Sakono et al.

[11] Patent Number: 5,087,113
[45] Date of Patent: Feb. 11, 1992

[54] LIQUID CRYSTAL DISPLAY DEVICE

[75] Inventors: Ikuo Sakono, Osaka; Motokazu Inui, Kawachinagano; Hiroaki Kato, Nara, all of Japan

[73] Assignee: Sharp Kabushiki Kaisha, Osaka, Japan

[21] Appl. No.: 480,947

[22] Filed: Feb. 16, 1990

Related U.S. Application Data

[63] Continuation of Ser. No. 241,351, Sep. 7, 1988, abandoned.

Foreign Application Priority Data

Feb. 25, 1988 [JP] Japan .................. 63-43553

[51] Int. Cl.$^5$ ................................. G02F 1/13
[52] U.S. Cl. ...................... 359/59; 340/784; 359/54; 359/87
[58] Field of Search ............ 350/333, 334, 339 R, 350/336; 340/784, 719; 357/26.3, 27

[56] References Cited

U.S. PATENT DOCUMENTS

| | | | |
|---|---|---|---|
| 4,385,292 | 5/1983 | Nonomura et al. | 340/719 |
| 4,697,331 | 10/1987 | Boulitrop et al. | 350/336 X |
| 4,700,457 | 10/1987 | Matsukawa | 357/51 X |
| 4,759,610 | 7/1988 | Yanagisawa | 350/334 |
| 4,772,099 | 9/1988 | Kato et al. | 350/334 |
| 4,810,060 | 3/1989 | Ukai | 350/333 |
| 4,816,885 | 3/1989 | Yoshida et al. | 350/339 R |
| 4,820,024 | 4/1989 | Nishiura | 350/333 |
| 4,821,092 | 4/1989 | Noguchi | 350/336 X |
| 4,839,707 | 6/1989 | Shields | 350/334 X |
| 4,907,046 | 3/1990 | Ohji et al. | 357/23.6 |

FOREIGN PATENT DOCUMENTS

| | | |
|---|---|---|
| 0135509 | 8/1984 | European Pat. Off. |
| 62-16019 | 1/1987 | Japan |
| 2118365 | 4/1983 | United Kingdom |
| 2120827 | 5/1983 | United Kingdom |

OTHER PUBLICATIONS

"Substrate for MIS Type Active Matrix Display Device"-No. 61-151516 Shunichi Monobukuro; Jul. 10, 1986.

*Primary Examiner*—Stanley D. Miller
*Assistant Examiner*—Huy K. Mai

[57] ABSTRACT

A liquid crystal display device is described which contains picture element electrodes arranged on an insulating substrate and thin film transistors for switching the voltage to be applied to the picture element electrodes. The device is characterized in that additional capacity electrodes are formed from the same material as electrodes of the thin film transistors, between the insulating substrate and the picture element electrodes.

14 Claims, 2 Drawing Sheets

LIQUID CRYSTAL DISPLAY DEVICE

This application is a continuation of copending application Ser. No. 241,351, filed on Sept. 7, 1988, now abandoned.

BACKGROUND OF THE INVENTION

The present invention is directed to a liquid crystal matrix display device which uses thin film transistors (hereinafter referred to as TFTs) as address devices for switching picture elements. More particularly the present invention is directed to a liquid crystal active matrix display device which uses, as address devices, reverse stagger type TFTs whose semiconducting film is made of amorphous silicon (a—Si).

FIGS. 3(A) and 3(B) show the construction of the conventional liquid crystal active matrix display device using reverse stagger type TFTs as address devices. This liquid crystal display device comprises a pair of cell substrates which are opposed to each other. The liquid crystal element is sealed in the gap between the pair of cell substrates, thereby forming a liquid crystal cell. One of the two cell substrates comprises gate electrodes 102, gate insulating film 105, a—Si (amorphous silicon) semiconducting film 106, insulating film 107, n+—a—Si (n+-amorphous silicon) contact film 108 for ohmic contact, source and drain electrodes 109, picture element electrodes 110 for display and protective film 111 laminated on an insulating substrate 101. The picture element electrodes 110 are arranged in a matrix-type fashion. An additional capacity Cs, parallel to the liquid crystal capacity, is formed to improve the picture element potential for retaining characteristics and minimizing the picture element electrode potential level shift at the time of the fall of the gate voltage, attributable to the overlapping capacity between the gate electrode 102 and the drain electrode 109. The additional capacity Cs is obtained by forming the transparent conducting film in two layers on the insulating substrate 101 with the extension of the gate insulating film 105 between the two layers being the means for isolating them for each other. The first layer of the conducting film serves as a ground electrode 112 and the second layer serves as the picture element electrode 110, as shown in FIG. 3(B).

According to the above conventional art, as mentioned above, the ground electrode 112 for providing the additional capacity Cs is made of a transparent conducting film. Therefore, the resistance of the ground electrode 112 for additional capacity Cs is high, and therefore causes a large load on the driver circuit. The resistance of the ground electrode 112 for additional capacity Cs could be reduced by increasing the thickness or width of the ground electrode film 112. However, a greater film thickness would result in a greater difference in level between the ground electrode 112 and the insulating substrate 101. This would thereby cause breakage of the source electrode and other elements of each TFT to be formed in a later process. On the other hand, a greater electrode width would result in a higher probability of short circuit occurring the ground electrode 112 for additional capacity Cs. It would further increase the probability the picture element electrode 110 and for short circuit between the ground electrode 112 and the source electrode 109. Finally, it would also result in a larger capacity occurring between the ground electrode 112 for additional capacity Cs, and the source electrode 109. This would thus cause a level shift in signals.

In addition, the thicker or wider that the ground electrode 112 for additional capacity Cs is, the larger number of manufacturing processes necessary. This would not be favorable.

SUMMARY OF THE INVENTION

In view of the above mentioned problems, an object of the present invention is to provide a liquid crystal display device having an electrode for additional capacity which provides a large capacity in spite of a small area. It further would not increase the number of manufacturing processes, such as film formation and etching.

Another object of the present invention is to provide a liquid crystal display device which has an improved picture element potential retaining characteristic.

Another object of the present invention is to provide a liquid crystal display device which can reduce the picture element electrode potential level shift at the time of the fall of the gate voltage. This is attributable to the overlapping capacity between the gate electrode and drain electrode.

Still another object of the present invention is to provide a liquid crystal matrix display device which uses, as address devices, reverse stagger type TFTs (thin film transistors) which are capable of providing an additional capacity with a high yield.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above mentioned objects, according to an embodiment of the present invention, a liquid crystal display device is utilized which comprises picture element electrodes arranged on an insulating substrate; thin film transistors for switching the voltage applied to the picture element electrodes; and electrodes for additional capacity made from the same material as an electrode of each of the thin film transistors, formed between the insulating substrate and the picture element electrodes.

The above mentioned of the invention improves the picture element potential retaining characteristics and reduces the picture element electrode potential level shift at the time of the fall of gate voltage. This is attributable to the overlapping capacity between each gate electrode and each drain electrode.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE REFERRED EMBODIMENT

Figure 1:
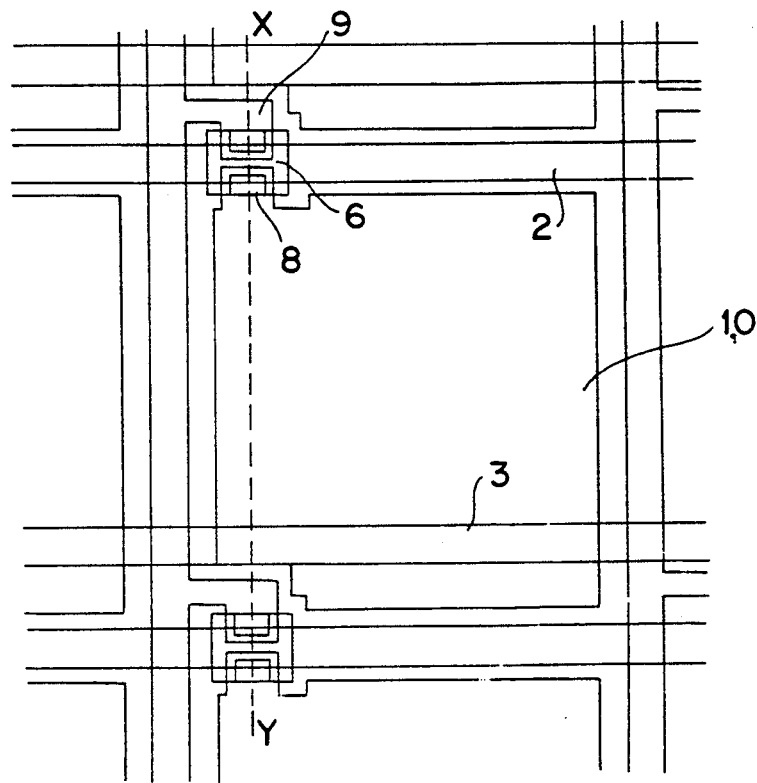
FIG. 1 is a plan view of an embodiment of the liquid crystal display device of the present invention.

According to a preferred embodiment of the present invention, a liquid crystal active matrix display device which uses reverse stagger type TFTs (thin film transistors) as address devices generally comprises a pair of cell substrates faced so as to oppose each other and a liquid crystal element sealed in the space formed between a pair of the cell substrates to thereby form a liquid crystal cell. One of the pair of the cell substrates comprises gate electrodes 2, gate insulating film 5, a—Si (amorphous silicon) semiconducting film 6, insulating film 7, n+—a—Si (amorphous silicon) contact film 8 for ohmic contact, source and drain electrodes 9, picture element electrodes 10 and protective film 11 laminated on an insulating substrate 1. Electrodes corresponding to the above-mentioned picture element electrodes are also formed on the other cell substrate. The picture element electrodes 10 are arranged in a matrix-type fashion.

Figure 2:
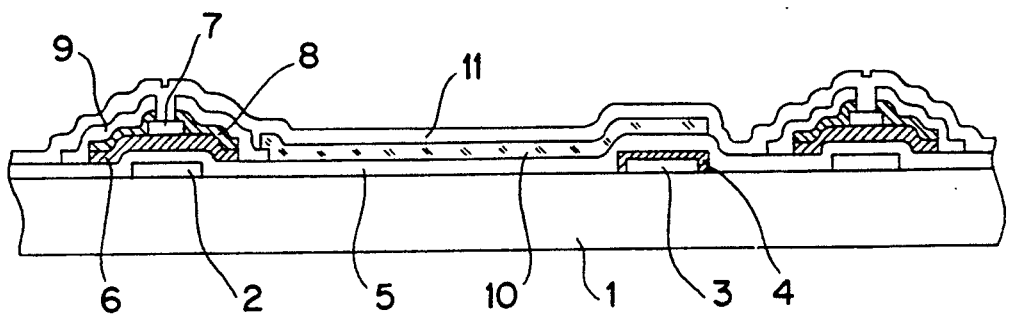
FIG. 2 is a sectional view along the line X—Y of FIG. 1.
Figure 3A:
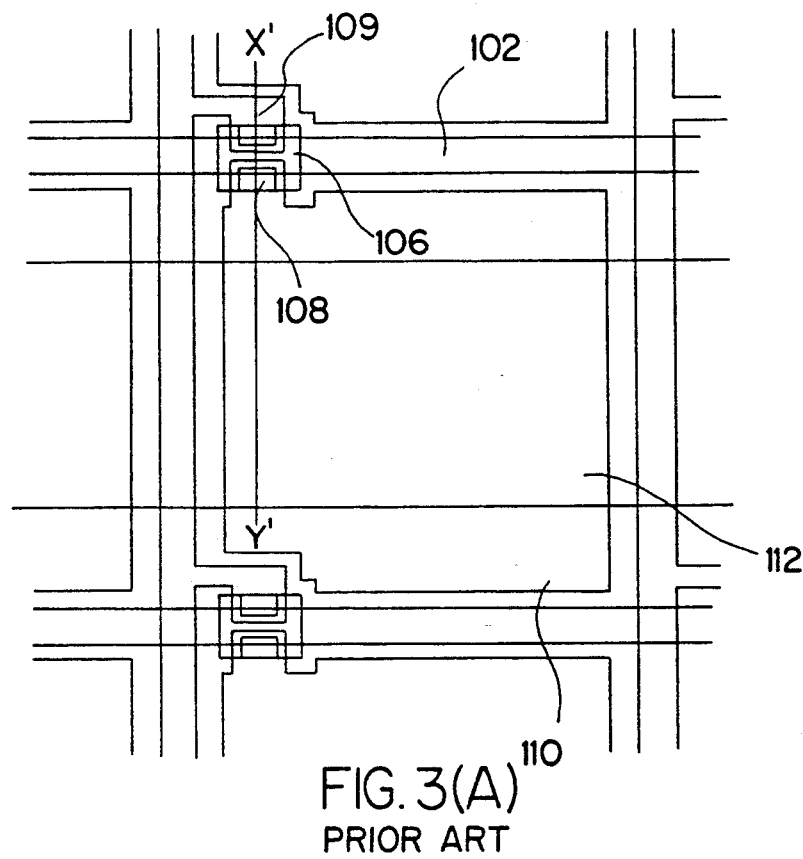
FIGS. 3(A) and 3(B) show the construction of the conventional liquid crystal display device.
Figure 3B:
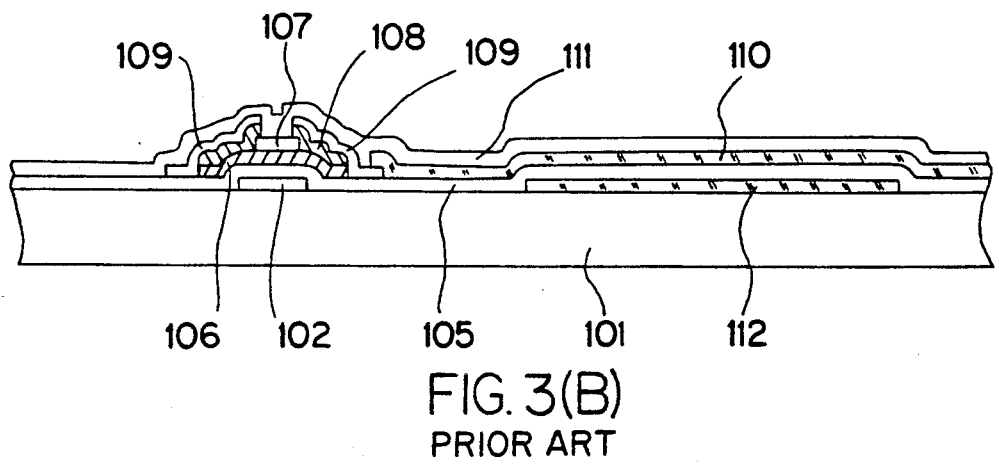

The cell substrate construction of an embodiment of the present invention is described in detail below with reference to FIGS. 1 and 2.

Ta (tantalum) or another material which is suitable for a TFT electrode, is applied by sputtering to a thickness of about 3000Å on an insulating substrate 1 of a glass. It is then patternized by photo etching to form gate electrodes 2 of the TFTs and additional capacity electrodes 3 at specified pitches on the same plane. Then the Ta surface of each additional capacity electrode 3 is oxidized by anodic oxidation to form an insulating film 4 of Ta$_2$O$_5$ (tantalum pentoxide) with about 2000Å thickness.

Ta$_2$O$_5$ (tantalum pentoxide) presents a high dielectric constant and therefore is suitable for high capacity. Insulating film 5 of SiNx (silicon nitride) is then deposited by plasma CVD to a thickness of about 2000Å over the entire surface. This isolates the gate electrodes 2 and Cs (additional capacity) electrodes 3. In succession, a semiconducting film 6 of a-Si(amorphous silicon) is formed to a thickness of about 300Å to serve as a semiconducting film of the TFTs. Further, an insulating film 7 of SiNx (silicon nitride) is formed to a thickness of about 2000Å on the semiconducting film 6. Through patternization by photo etching, the patterned semiconducting film 6 is obtained over each gate electrode 2 and the patterned insulating film 7, on the semiconducting film 6. In other words, the semiconducting film 6 and insulating film 7 are arranged in the matrix to correspond to the matrix of the TFTs. Next, a semiconducting contact film 8 of n+—a—Si (n+-amorphous silicon) for ohmic contact is formed to a thickness of about 400Å by plasma CVD, and patternized by photo etching. This forms a patterned semiconducting contact film 8 which is in contact with source and drain electrodes.

Then, Ti, Mo or W film is deposited to a thickness of about 3000Å by sputtering or electron beam evaporation. It is then patternized by photo etching to obtain source and drain electrodes 9 of a pattern suitable for TFTs. Switching TFTs are thus formed. Transparent conducting film, mainly composed of indium oxide, is deposited to a thickness of about 1000Å by sputtering or electron beam evaporation. It is then patternized by photo etching to form rectangular picture element electrodes 10, an end of each of which is joined with the drain electrode 9 of each TFT. The other end then extends to a point over the Cs (additional capacity) electrode 3. A protective film 11 of SiNx (silicon nitride) is further deposited by plasma CVD to a thickness of about 5000Å over the entire surface. Thus, one of the pair of cell substrates of the liquid crystal active matrix display device is obtained in which Cs (additional capacity) electrodes 3 of the same material as the gate electrodes 2 are formed under the picture element electrodes 10 and on the same plane as the gate electrodes 2 on the insulating substrate 1.

The other cell substrate, an electrode substrate, is manufactured and contains electrodes corresponding to those on the first cell substrate. Thereby, an electric field is applied to the to liquid crystal in cooperation with the picture element electrodes 10. The first cell substrate and the mating electrode substrate are joined in a body, with a specified gap therebetween. The liquid crystal is sealed in this gap. A liquid crystal display device is obtained when the liquid crystal cell is processed for twisted nematic orientation. In the liquid crystal display device thus obtained, the picture element electrodes 10 are arranged in a matrix and TFTs are connected as switching devices, to the picture element electrodes 10, respectively. A color display device is then obtained when a color filter is superposed on the picture element electrodes 10.

When an electric field is applied through the TFTs to the liquid crystal between selected picture element electrodes 10 and the corresponding electrodes on the other cell substrate, matrix display by picture elements is obtained. At this time, an additional capacity is generated between each picture element electrode 10 and each Cs electrode 3. This capacitor characteristic permits the electric field, determined by the time constant, to be applied to the liquid crystal, even upon shutting off the electric field application to the picture element electrodes 10 occurring, by turning off the TFTs. As a result, the liquid crystal display device can provide a high definition, clear picture.

As described above, in the liquid crystal display device of the present invention, reverse stagger type TFTs are formed on an insulating substrate. Electrodes for additional capacity (Cs) can be made of tantalum or the same material as electrodes of the TFTs, for example that of the gate electrodes. They are formed under the picture element electrodes, on the same plane as the gate electrodes. For insulation of the additional capacity (Cs) electrodes, tantalum pentoxide film, produced by anodic oxidation of the tantalum of the additional capacity (Cs) electrodes, and silicon nitride film, are used.

Compared with the additional capacity electrodes made of transparent conducting film, those of the present invention provide lower resistance and yet are smaller in thickness and in width.

In the above mentioned embodiment, tantalum (Ta) is used as the material of the additional capacity electrodes. Another material may be used as long as it is the same as that of the gate, source or drain electrodes of the TFTs. However, it is most preferable to use the same material as that of the gate electrodes.

According to the present invention, as understood from above, it is possible to form electrodes for additional capacity (Cs) without increasing the number of film forming and etching processes. Besides, since low resistance material is used for the additional capacity (Cs) electrodes, large capacity can be attained by the Cs electrodes of small area. Therefore, additional capacity can be generated at a high yield with little affect on other processes.

The additional capacity attained by the present invention improves the picture element potential retaining characteristic, and reduces effectively, the picture element electrode potential level shift attributable to the capacity of the overlapping portion between the gate electrodes and drain electrodes at the time of the fall of the gate voltage.

While only certain embodiments of the present invention have been described, it will be apparent to those skilled in the art that various changes and modifications may be made therein without departing from the spirit and scope of the present invention a claimed.

What is claimed is:

1. A thin film transistor array for a liquid crystal display device comprising:
    an insulating substrate;
    a plurality of gate electrodes formed on the insulating substrate;
    a plurality of additional capacity electrodes formed on the insulating substrate on substantially the same plane as that of the gate electrodes, and made of tantalum, the same material as the gate electrodes, to provide a low resistance and to allow for formation of a plurality of additional capacity electrodes small in thickness and width;
    an insulating film covering at least the gate electrodes and the additional capacity electrodes;
    a plurality of picture element electrodes formed on the insulating film in a matrix form; and
    a plurality of thin film transistors formed on the insulating film and connected to said gate electrodes, said thin film transistors being coupled to the picture element electrodes respectively, for switching the voltage to be applied to the corresponding picture element electrodes.

2. A thin film transistor array as claimed in claim 1, wherein the thin film transistors are of reverse stagger type.

3. A thin film transistor array as claimed in claim 1, wherein other insulating films are formed on the additional capacity electrodes.

4. A thin film transistor array as claimed in claim 3, wherein the other insulating films includes tantalum oxide films.

5. A thin film transistor array as claimed in claim 4, wherein the tantalum oxide films include tantalum pentoxide films.

6. A thin film transistor array as claimed in claim 1, wherein the insulating film includes silicon nitride film.

7. A thin film transistor array for a liquid crystal display device comprising:
    an insulating substrate;
    picture element electrodes arranged on the insulating substrate;
    thin film transistors, including drain, source and gate electrodes, connected to said picture element electrodes, for switching the voltage to be applied to the picture element electrodes; and
    additional capacity electrodes, formed of tantalum, the same material as the gate electrodes of the thin film transistors, to provide a low resistance and to allow for formation of additional capacity electrodes small in thickness and width, and located on the insulating substrate a predetermined pitch from said thin film transistors and below the picture element electrodes, for improving picture element potential retaining characteristics, said additional capacity electrodes being formed on substantially the same plane as that of the gate electrodes.

8. A thin film transistor array as claimed in claim 7, wherein the thin film transistors are of reverse stagger type.

9. A thin film transistor as claimed in claim 7, further comprising insulation film for insulating the additional capacity electrodes from the picture element electrodes.

10. A thin film transistor array as claimed in claim 9, wherein the insulating film is made of an oxidized version of the material of the additional capacity electrodes.

11. A thin film transistor array as claimed in claim 7, further comprising insulating film for insulating the additional capacity electrodes from the picture element electrodes.

12. A thin film transistor array as claimed in claim 11, wherein the insulation film includes tantalum pentoxide film, an oxidized version of tantalum.

13. A thin film transistor array as claimed in claim 11, wherein the insulation film includes silicon nitride film.

14. A thin film transistor array for a liquid crystal displace device comprising:
    an insulating substrate;
    picture element electrodes arranged on said substrate;
    a plurality of thin film transistors, connected to said picture element electrodes, for addressing selected ones of said picture element electrodes, and supplying voltage for illuminating said selected ones of said picture element electrodes, each said thin film transistor including,
    drain electrode,
    source electrode, and
    gate electrodes; and
    additional capacity electrodes, positioned at a predetermined pitch from said thin film transistors on said insulating substrate, made of tantalum, the same material as the gate electrodes, to provide a low resistance, to allow for formation of additional capacity electrodes small in thickness and width, and for retaining a large capacitance value and thereby improving said picture element electrodes ability to retain voltage potential, said additional capacity electrodes being formed on substantially the same plane as that of the gate electrodes.

* * * * *